Patented Mar. 8, 1932

1,848,268

UNITED STATES PATENT OFFICE

HANS PERSIEL, OF HORNAU IN TAUNUS, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS OF PREPARING ARTIFICIAL MATERIALS AND COATINGS OF ALL KINDS

No Drawing. Application filed September 16, 1929, Serial No. 393,123, and in Germany September 22, 1928.

This invention relates to a process for the manufacture of artificial material, such as plastic masses, threads, films or sheets, layers and coatings of all kinds from water-insoluble binding agents, such as, for instance natural or artificial resins, drying oils, rubber and cellulose derivatives, whereby the binding agent can be shaped without the assistance of a plasticising agent or solvent, and products are obtained which in respect of the ease and certainty with which they may be obtained and used are far superior to the masses and solutions obtainable from the aforesaid binding agents by methods hitherto known.

For this purpose the binding agent, which must be practically insoluble in water but may be capable of swelling slightly in water, is first dispersed in water so as to produce an aqueous paste, suspension or emulsion. The structure and consistency of the aqueous dispersion may be influenced in various ways by suitable choice of the particular method of producing the dispersion. It is usually sufficient to grind the binding agent with water, for instance in a colloid mill, until there is produced a magma capable of being spread, sprayed or otherwise formed. There may advantageously be added an aqueous solution of a colloid which promotes the dispersion of the water-insoluble binding agent, stabilizes the finished dispersion and imparts to it desired properties, such as elasticity or plasticity. Suitable colloids are, for instance, water-soluble starch preparations, glue-like substances, water-soluble cellulose derivatives, and inorganic colloids, such as alumina sols or silicic acid sols. Instead of a colloid of which a considerable quantity must generally be dissolved in the water if it is to be effective (for instance quantities of 1–75 per cent) there may be added a so-called emulsifying or wetting agent for the purpose of increasing the degree of dispersion of the water-insoluble binding agent; even a very small proportion of such an agent has a favourable effect on the degree of dispersion, for instance, a proportion below 1 per cent or even less than 0.01 per cent.

The dispersion prepared according to one of the methods described above is brought into the desired shape by spreading, spraying, kneading, or otherwise; in this operation the dispersion may be combined, if desired, with a textile material or applied to a wooden or metallic surface or to another support or foundation. It is then treated with an agent capable of dissolving, swelling or gelatinizing the dispersed water-insoluble body. It is unnecessary to dry the dispersion prior to this stage of the process; when drying is dispensed with, the solvent or swelling agent used may if required be one which is capable of expelling water from the mass or facilitating its evaportion, or one which at least is so much less volatile than water that the water evaporates from the dispersion during the subsequent drying process before the mass has become too solid. Final products which are anhydrous or contain but little water may also be obtained, however, if the emulsion is first completely or partially dried and only then treated with a solvent or swelling agent, which may be used either in the form of vapor or in a liquid state, and either in concentrated form or together with a diluent. The solvent or swelling agent may also contain non-volatile material; for example there may be used a lacquer containing a solvent. The material may finally be improved by the action of heat or cold or application of a raised or diminished temperature, by working or other mechanical treatment, or by the application of a raised or reduced pressure.

The following examples serve to illustrate the invention, but they are not intended to limit it thereto, the parts being by weight:

1. 100 parts of nitrocellulose are intimately kneaded with 100 parts of water and 100 parts of methyl cellulose until a cement-like mass is produced. By further kneading or grinding with 100—500 parts of a filling agent, such as sawdust, kieselguhr or chalk which previously can also be made into a paste by mixing them with water, a primer is obtained, which may be used for light-colored wood. The primer is applied in the usual manner, if necessary, after having been further diluted with water. After having been allowed to dry, which operation may be accelerated by moderately heating the primer is coated with a slowly drying nitrocellulose lacquer. The solvents of said lacquer penetrate into the primer and cause the nitrocellulose particles dispersed therein to swell and to agglutinate with each other and with the wood.

2. 100 parts of a water-insoluble ethyl cellulose are made into a paste with 150 parts of ultramarine blue by means of a solution consisting of 1 part of the sodium salt of a butylated naphthalene-sulfonic acid in 50 parts of water. After dilution with water to spread consistency during which operation a glue solution or a starch solution may be added in order to prevent sitting, the paint thus obtained is applied on beton. The dry painting is sprayed with a mixture of 60 parts of benzene and 40 parts of alcohol until the whole surface is moistened. After volatilization of the solvents there remains a coherent well adhering protective color.

3. 100 parts of oil varnish are intimately mixed with a solution of 28 parts of methylcellulose in 252 parts of water and ground with such a quantity of cork powder that a mass is obtained which can just be formed. The mixture is rolled in a thin layer upon a base, for instance upon a tissue or a card board, and after it has been allowed to dry a little it is covered with a short-oil varnish whose diluent penetrates into the layer, dissolving the emulsified oily particles and causing them to form a coherent film. By drying in the open air, the mass hardens so as to form an elastic layer. The mixture can be applied repeatedly and thus, for instance, a flooring can be prepared.

4. 100 parts of ester resin are fused and 20 parts of methyl cellulose are introduced into the fused mass, the temperature being from 90° C. to 100° C. While vigorously stirring, a boiling solution of 10 parts of resin-soap in 200 parts of water is added. Stirring is continued until the mixture has cooled to room-temperature. Then the thickly liquid dispersion is mixed with 150–250 parts of saw-dust so that a kneadable mass is formed from which there may be prepared shaped bodies such as bars, plates and buttons. After the pressed bodies have been allowed to dry a little they are placed into a mixture of 50 parts of oil varnish and 50 parts of benzene until their surfaces are slightly swollen; they are then completely dried, turned and polished if necessary.

I claim:

1. Process of preparing artificial materials and coatings of all kinds, which consists in finely dispersing with water nitrocellulose in in the presence of a water-soluble cellulose ether and then treating the dispersion after bringing it into a desired shape with an agent which is capable of causing the nitro cellulose to swell.

2. Process of preparing artificial materials and coatings of all kinds, which consists in finely dispersing with water nitro cellulose in the presence of methyl cellulose and then treating the dispersion after bringing it into a desired shape with an agent which is capable of causing the nitro cellulose to swell.

3. Process of preparing artificial materials and coatings of all kinds, which consists in finely dispersing nitro cellulose in the presence of methyl cellulose and then treating the dispersion after bringing it into a desired shape with a solvent which causes the nitro cellulose to swell.

4. Process of preparing artificial materials and coatings of all kinds, which consists in finely dispersing nitro cellulose in the presence of methyl cellulose and then treating the dispersion after bringing it into a desired shape with a solvent, which also contains a binding agent and which causes the nitro cellulose to swell.

5. Process of preparing artificial materials and coatings of all kinds, which consists in finely dispersing nitro cellulose in the presence of methyl cellulose and then treating the dispersion after bringing it into a desired shape with a nitro cellulose lacquer.

6. The process of preparing artificial materials and coatings of all kinds, which consists in finely dispersing with water a binding agent which is insoluble in water in the presence of a water-soluble cellulose ether, and then treating the dispersion after bringing it into a desired shape with an agent which is capable of causing the binding agent to swell.

7. The process of preparing artificial materials and coatings of all kinds, which consists in finely dispersing with water a cellulose derivative which is insoluble in water in the presence of a water-soluble cellulose ether and then treating the dispersion after bringing it into the desired shape with an agent which is capable of causing the cellulose derivative to swell.

In testimony whereof, I affix my signature.

HANS PERSIEL.